(12) United States Patent
Yamamoto et al.

(10) Patent No.: US 10,961,400 B2
(45) Date of Patent: Mar. 30, 2021

(54) METHOD FOR FORMING MULTILAYER COATING FILM

(71) Applicant: KANSAI PAINT CO., LTD., Hyogo (JP)

(72) Inventors: Keitaro Yamamoto, Hyogo (JP); Masahiro Tada, Tokyo (JP); Hirohisa Tsuda, Hyogo (JP); Hideaki Katsuta, Hyogo (JP)

(73) Assignee: KANSAI PAINT CO., LTD., Hyogo (JP)

( * ) Notice: Subject to any disclaimer, the term of this patent is extended or adjusted under 35 U.S.C. 154(b) by 193 days.

(21) Appl. No.: 16/316,414

(22) PCT Filed: Apr. 11, 2017

(86) PCT No.: PCT/JP2017/014836
§ 371 (c)(1),
(2) Date: Jan. 9, 2019

(87) PCT Pub. No.: WO2018/012067
PCT Pub. Date: Jan. 18, 2018

(65) Prior Publication Data
US 2019/0292379 A1   Sep. 26, 2019

(30) Foreign Application Priority Data

Jul. 13, 2016  (JP) ............................. JP2016-138235

(51) Int. Cl.
| | | |
|---|---|---|
| C09D 5/08 | (2006.01) | |
| C09D 5/00 | (2006.01) | |
| C09D 163/00 | (2006.01) | |
| C09D 175/14 | (2006.01) | |
| B05D 7/24 | (2006.01) | |
| B05D 7/14 | (2006.01) | |
| C09D 133/04 | (2006.01) | |
| C09D 175/08 | (2006.01) | |
| C09D 161/28 | (2006.01) | |
| C09D 175/04 | (2006.01) | |
| B05D 1/36 | (2006.01) | |

(52) U.S. Cl.
CPC ............... *C09D 5/082* (2013.01); *B05D 1/36* (2013.01); *B05D 7/14* (2013.01); *B05D 7/24* (2013.01); *C09D 5/00* (2013.01); *C09D 5/002* (2013.01); *C09D 133/04* (2013.01); *C09D 161/28* (2013.01); *C09D 163/00* (2013.01); *C09D 175/04* (2013.01); *C09D 175/08* (2013.01); *C09D 175/14* (2013.01)

(58) Field of Classification Search
None
See application file for complete search history.

(56) References Cited

U.S. PATENT DOCUMENTS

| | | | |
|---|---|---|---|
| 2003/0039757 A1 | 2/2003 | Yoneda et al. | |
| 2011/0105645 A1* | 5/2011 | Nagel | C09D 7/69 523/220 |
| 2013/0048501 A1* | 2/2013 | Yamane | B05D 7/577 205/50 |
| 2014/0030528 A1* | 1/2014 | Kitagawa | C08G 18/6225 428/407 |
| 2014/0147597 A1 | 5/2014 | Kondo et al. | |

FOREIGN PATENT DOCUMENTS

| | | |
|---|---|---|
| JP | 2002-285044 | 10/2002 |
| JP | 2003253211 A * | 9/2003 |
| JP | 2009-046564 | 3/2009 |
| JP | 2010-168524 | 8/2010 |
| JP | 2014-151257 | 8/2014 |
| WO | 2013/008879 | 1/2013 |
| WO | 2013/024784 | 2/2013 |

OTHER PUBLICATIONS

Machine Translation of JP 2003/253211 A (Year: 2003).*
International Search Report dated Jul. 11, 2017 in International (PCT) Application No. PCT/JP2017/014836.

* cited by examiner

*Primary Examiner* — Shamim Ahmed
*Assistant Examiner* — Bradford M Gates
(74) *Attorney, Agent, or Firm* — Wenderoth, Lind & Ponack, L.L.P.

(57) ABSTRACT

The present invention provides the following method for forming a multilayer coating film. The method comprises forming an uncured coating film of a specific primer paint composition (A) on a substrate, forming a top coating film of a specific top paint composition (B) on the uncured coating film, and simultaneously drying the films. The primer paint composition (A) is a paint composition comprising an epoxy resin (a1), a rust preventive pigment (a2), a color pigment (a3), and an extender pigment (a4); and the top paint composition (B) is a paint composition comprising an acrylic resin (b1) and an active methylene blocked polyisocyanate compound (b2).

6 Claims, No Drawings

METHOD FOR FORMING MULTILAYER COATING FILM

TECHNICAL FIELD

The present invention relates to a method comprising forming an uncured coating film of a primer paint composition on a substrate, and applying a top paint composition on the uncured coating film by a wet-on-wet process; and a coated article obtained by the above method.

BACKGROUND ART

A coating method called a wet-on-wet process is known. In this method, a primer paint composition is applied to a substrate, after which a top paint composition is applied thereto without drying the primer paint composition, and then the two coating films are simultaneously dried; thus, this method can reduce steps.

A wet-on-wet coating method has recently been used to reduce steps for coating industrial machinery or construction machinery, such as bulldozers, hydraulic excavators, and wheel loaders. However, the wet-on-wet coating method used for industrial machinery or construction machinery has the problems disclosed in Items 1 to 3 below.

1. In drying a coating film, heat in a drying furnace is not sufficiently transferred due to large heat capacity of a substrate; thus, the curability of the coating film is not sufficient. Accordingly, it has been difficult to obtain a coated article having excellent appearance and corrosion resistance by a wet-on-wet coating method including fewer drying steps.

2. Since construction machinery or industrial machinery has many perpendicular portions, uncured coating films may sag due to wet-on-wet coating, and the appearance will be unstable in some portions.

3. Since construction machinery or industrial machinery is used outside, coating film curability, corrosion resistance, weatherability, etc., are required.

Patent Literature 1 discloses a coating method using a wet-on-wet process, wherein an undercoating paint composition comprises an acrylic resin, epoxy resin, isocyanate compound, and surface adjusting agent; a top paint composition comprises an acrylic resin, isocyanate compound, and surface adjusting agent; and the value $\Delta\gamma$ ($\gamma 1 - \gamma 2$) obtained by subtracting the value ($\gamma 2$) of the surface tension of the top paint composition from the value ($\gamma 1$) of the surface tension of the undercoating paint composition is 2 to 8 mN/m.

Patent Literature 2 discloses, in addition to the conditions disclosed in PTL 1, a method for forming a coating film in which an undercoating film and a top coating film have a lamellar length of 4 mm or less.

However, the coated articles obtained by the methods for forming a coating film disclosed in PTL 1 and 2 have poor appearance, corrosion resistance, weatherability, or chemical resistance; accordingly, improvement has been desired.

CITATION LIST

Patent Literature

PTL 1: WO2013/24784
PTL 2: JP2014-151257A

SUMMARY OF INVENTION

Technical Problem

An object of the present invention is to provide a coated article having excellent appearance, corrosion resistance, weatherability, and chemical resistance by a method for forming a multilayer coating film comprising forming an uncured coating film of a primer paint composition on a substrate, forming a top paint coating film on the uncured coating film, and simultaneously drying the films.

Solution to Problem

As a result of extensive research, the present inventors found that the above problems can be solved, and thus accomplished the present invention.

Specifically, the present invention includes the following.
Item 1. A method for forming a multilayer coating film comprising forming an uncured coating film of a primer paint composition (A) as defined below on a substrate, forming a top coating film of a top paint composition (B) as defined below on the uncured coating film, and simultaneously drying the films.
Primer Paint Composition (A):
A paint composition comprising an epoxy resin (a1), a rust preventive pigment (a2), a color pigment (a3), and an extender pigment (a4), the composition containing the rust preventive pigment (a2) in an amount of 1 to 70 parts by mass, the color pigment (a3) in an amount of 40 to 150 parts by mass, and the extender pigment (a4) in an amount of 40 to 150 parts by mass, per 100 parts by mass of the total solids content of the epoxy resin (a1);
Top Paint Composition (B):
A paint composition comprising an acrylic resin (b1) and an active methylene blocked polyisocyanate compound (b2), the composition containing the acrylic resin (b1) and the active methylene blocked polyisocyanate compound (b2) in a proportion of 60 to 80 parts by mass to 20 to 40 parts by mass, per 100 parts by mass of the total solids content of the acrylic resin (b1) and the active methylene blocked polyisocyanate compound (b2).
Item 2. The method according to Item 1, wherein the primer paint composition (A) further comprises a silane coupling agent (a5) in an amount of 0.1 to 10 parts by mass, per 100 parts by mass of the total solids content of the epoxy resin (a1).
Item 3. The method according to Item 1 or 2, wherein the primer paint composition (A) comprises talc as at least part of the extender pigment (a4) in an amount of 0.1 to 30 parts by mass, per 100 parts by mass of the total solids content of the epoxy resin (a1).
Item 4. The method according to any one of Items 1 to 3, wherein the top paint composition (B) further comprises a melamine resin (b3) in an amount of 1 to 15 parts by mass, per 100 parts by mass of the total solids content of the acrylic resin (b1) and the active methylene blocked polyisocyanate compound (b2).
Item 5. The method according to any one of Items 1 to 4, wherein the top paint composition (B) comprises polyether polyol in an amount of 0.1 to 30 parts by mass, per 100 parts by mass of the total solids content of the acrylic resin (b1) and the active methylene blocked polyisocyanate compound (b2).
Item 6. Construction machinery or industrial machinery coated by using the method according to any one of claims 1 to 5.
Item 6-1. A method for producing construction machinery or industrial machinery having a multilayer coating film, the method comprising the step of forming a multilayer coating film by using the method according to any one of Items 1 to 5.

Advantageous Effects of Invention

The present invention provides a coated article having excellent appearance, corrosion resistance, weatherability, and chemical resistance by a method for forming a multilayer coating film comprising forming an uncured coating film of a primer paint composition, forming a top paint coating film on the uncured coating film, and simultaneously drying these films, i.e., by a wet-on-wet process.

DESCRIPTION OF EMBODIMENTS

The present invention relates to a method for forming a multilayer coating film, comprising forming an uncured coating film of a specific primer paint composition (A) on a substrate, forming a top coating film of a specific top paint composition (B) on the uncured coating film, and simultaneously drying these films; and a coated article. The present invention is explained in detail below.

Primer Paint Composition (A)

The primer paint composition (A) is a paint composition comprising an epoxy resin (a1), rust preventive pigment (a2), color pigment (a3), and extender pigment (a4). The paint composition contains the rust preventive pigment (a2) in an amount of 1 to 70 parts by mass, the color pigment (a3) in an amount of 40 to 150 parts by mass, and the extender pigment (a4) in an amount of 40 to 150 parts by mass, per 100 parts by mass of the total solids content of the epoxy resin (a1).

Epoxy Resin (a1)

The epoxy resin (a1) used in the present invention is preferably an aromatic-based epoxy resin obtained by a reaction between a polyphenol compound and epihalohydrin.

Examples of polyphenol compounds that can be used for forming the aromatic-based epoxy resin include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,2,2-ethane, 4,4'-dihydroxydiphenylsulfone, phenol novolac, cresol novolac, and the like.

As the epoxy resin (a1) obtained by a reaction between a polyphenol compound and epihalohydrin, resins in the following formula, which are derived from bisphenol A, are preferable.

740-80M, EPICLON-FQ-065-P (both produced by DIC Corporation, trade names), and the like.

As the epoxy resin (a1), modified epoxy resins can be preferably used. Examples of modified epoxy resins include urethane modified epoxy resins, amine modified epoxy resins, acrylic modified epoxy resins, polyester modified epoxy resins, dimer acid modified epoxy resins, and the like.

Examples of commercially available products of the modified epoxy resins include Arakyd 9201N, Arakyd 9203N, Arakyd 9205, Arakyd 9208, Modepics 401 (all produced by Arakawa Chemical Industries, Ltd., trade names), EPICLON H-405-40, EPICLON H-304-40, EPICLON H-403-45, EPICLON H-408-40 (all produced by DIC Corporation, trade names), Epokey 811, Epokey 872, Epokey 891 (all produced by Mitsui Chemicals, Inc., trade names), and the like.

The epoxy resin (a1) preferably has a weight average molecular weight of 20000 or more, and more preferably 20000 to 60000.

The number average molecular weight or weight average molecular weight (mass average molecular weight) in the present specification is a value determined by converting the number average molecular weight or weight average molecular weight (mass average molecular weight) measured by gel permeation chromatography (GPC) based on the molecular weight of standard polystyrene. Specifically, "HLC8120GPC" (trade name, produced by Tosoh Corporation) is used as gel permeation chromatography, and four columns "TSKgel G-4000 HXL," "TSKgel G-3000 HXL," "TSKgel G-2500 HXL," and "TSKgel G-2000 HXL" (trade names, all produced by Tosoh Corporation) are used. Measurement was conducted under the following conditions: mobile phase: tetrahydrofuran; measurement temperature: 40° C.; flow rate: 1 ml/min.; and detector: RI.

Rust Preventive Pigment (a2)

The primer paint composition (A) contains a rust preventive pigment (a2) to improve corrosion resistance. Examples of the rust preventive pigment (a2) include zinc oxide, phosphite compounds, phosphate compounds, molybdate-based compounds, bismuth compounds, metal-ion exchanged silica, and the like.

Of the phosphite compounds, examples of phosphorous acid calcium salts include EXPERT NP1000 and EXPERT NP-1020C. Examples of phosphorous acid aluminum salts include EXPERT NP-1100, EXPERT NP-1102 (all produced by Toho Ganryo Co., Ltd., trade names), and the like.

Examples of the phosphate compound include aluminum dihydrogen tripolyphosphate treated with a metal compound. Examples of the metal compound include chlorides,

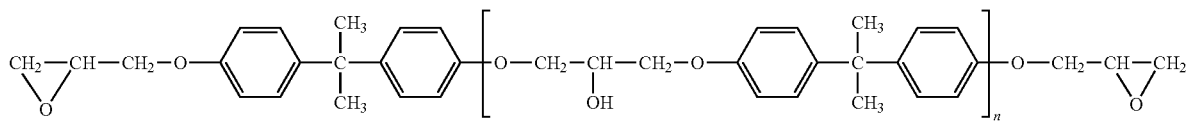

In the formula, n is preferably an integer of 0 to 8.

Examples of commercially available products of the epoxy resin (a1) include jER828EL, JER1001, jER1002, JER1003, jER1004, and jER1007 (all produced by Mitsubishi Chemical Corporation, trade names).

Other examples include AER-6003, AER-6071, AER-6072, AER-6097, AER-ECN1273 (all produced by Asahi Kasei Chemicals Corporation, trade names), EPICLON-N- hydroxides, carbonates, sulfates, etc., of zinc, calcium, magnesium, manganese, bismuth, cobalt, tin, zirconium, titanium, strontium, copper, iron, lithium, aluminium, nickel, and sodium.

Examples of commercially available products of aluminum dihydrogen tripolyphosphate treated with the metal compound include K-WHITE 140, K-WHITE Ca650, K-WHITE 450H, K-WHITE G-105, K-WHITE K-105, K-WHITE K-82 (all produced by Tayca Corporation, trade names), and the like.

Examples of commercially available products of molybdate-based compounds include LF Bosei M-PSN, LF Bosei MC-400WR, LF Bosei PM-300, PM-308 (all produced by Kikuchi Color, trade names), and the like.

Examples of the bismuth compound include bismuth oxide, bismuth hydroxide, bismuth carbonate basic, bismuth nitrate, bismuth silicate, organic acid bismuth, and the like.

Examples of the metal-ion exchanged silica include calcium-ion exchanged silica and magnesium-ion exchanged silica. This metal-ion exchanged silica is modified with phosphoric acid, if necessary, to obtain phosphoric acid-modified metal-ion exchanged silica. The above calcium-ion exchanged silica consists of silica particles obtained by introducing calcium ions into a microporous silica carrier by ion exchange. Examples of commercially available products of calcium-ion exchanged silica include Shieldex (registered trademark) C303, Shieldex AC-3, Shieldex C-5 (all produced by W.R. Grace & Co.), Sylomask 52 (produced by Fuji Silysia Chemical Ltd.), and the like.

The above magnesium-ion exchanged silica consists of silica particles obtained by introducing magnesium ions into a microporous silica carrier by ion exchange. Examples of commercially available products of magnesium-ion exchanged silica include Sylcmask 52M (produced by Fuji Silysia Chemical Ltd.) and Novinox ACE-110 (produced by SNCZ, France). Of these rust preventive pigments (a2), calcium phosphate is particularly preferable to attain excellent appearance and corrosion resistance.

The amount of the rust preventive pigment (a2) in the primer paint composition (A) is 1 to 70 parts by mass, preferably 2 to 40 parts by mass, and more preferably 5 to 30 parts by mass, per 100 pars by mass of the solids content of the epoxy resin (a1). This amount range is desirable to achieve excellent paint stability, corrosion resistance, and chipping resistance.

Color Pigment (a3)

Examples of the color pigment (a3) include titanium white, zinc molybdate, calcium molybdate, carbon black, graphite, iron black, berlin blue, ultramarine blue, cobalt blue, copper phthalocyanine blue, indanthrone blue, chrome yellow, synthetic yellow iron oxide, transparent iron oxide red, bismuth vanadate, titanium yellow, zinc yellow, monoazo yellow, ocher, disazo, isoindolinone yellow, metallic complex azo yellow, quinophthalone yellow, benzimidazolone yellow, iron oxide red, monoazo red, unsubstituted quinacridone red, azo-lake (Mn salt), quinacridone magenta, anthanthrone orange, dianthraquinonyl red, perylene maroon, perylene red, diketo pyrrolo-pyrrole chrome vermilion, chlorination phthalocyanine green, bromination phthalocyanine green, pyrazolone orange, benzimidazolone orange, dioxazine violet, perylene violet, and the like.

Examples of commercially available products of titanium white include "Ti-Pure R-100," "Ti-Pure R-101," "Ti-Pure R-102," "Ti-Pure R-103," "Ti-Pure R-104," "Ti-Pure R-105," "Ti-Pure R-108," "Ti-Pure R-900," "Ti-Pure R-902," "Ti-Pure R-960," "Ti-Pure R-706," and "Ti-Pure R-931 (all produced by Du Pont Co., Ltd., trade names); "Tipaque CR-93," "Tipaque CR-95," and "Tipaque CR-97" (all produced by Ishihara Sangyo Kaisha Ltd., trade names); "JR-301," "JR-403," "JR-405," "JR-600A," "JR-605," "JR-600E," "JR805," "JR-806," "JR-701," and "JR-901" (all produced by Tayca Corporation, trade names); and the like.

The amount of the color pigment (a3) in the primer paint composition (A) is 40 to 150 parts by mass, preferably 45 to 130 parts by mass, and more preferably 50 to 100 parts by mass, per 100 parts by mass of the solids content of the epoxy resin (a1). This amount range is desirable to achieve excellent paint stability, weatherability, and chemical resistance.

Extender Pigment (a4)

Examples of the extender pigment (a4) include clay, silica, barium sulfate, talc, calcium carbonate, white carbon, diatomite, magnesium carbonate, aluminum flake, mica flake, and the like.

The amount of the extender pigment (a4) in the primer paint composition (A) is 40 to 150 parts by mass, preferably 50 to 120 parts by mass, and more preferably 55 to 110 parts by mass, per 100 parts by mass of the total solids content of the epoxy resin (a1). This amount range is desirable to achieve excellent paint stability, appearance, and chemical resistance.

Examples of commercially available products of talc include "SIGMON," "Talc MS," "MICRO ACE SG-95," "MICRO ACE P-8," "MICRO ACE P-6," "MICROACE P-4," "MICRO ACE P-3," "MICRO ACE P-2," "MICRO ACE L-1," "MICRO ACE K-1," "MICRO ACE L-G," "MICRO ACE S-3," and "NANO ACE D-1000" (all produced by Nippon Talc Co., Ltd., trade names); "P Talc," "PH Talc," "PS Talc," "TTK Talc," "TT Talc," "T Talc," "ST Talc," "High Toron," "High Toron A," "Micro light," "High Rack", and "High Micron HE5" (all produced by Takehara Kagaku Kogyo Co., Ltd., trade names); and the like.

In particular, as at least part of the extender pigment (a4), it is preferable to contain talc in an amount of 0.1 to 30 parts by mass, preferably 3 to 25 parts by mass, and more preferably 7 to 20 parts by mass, per 100 parts by mass of the solids content of the epoxy resin (a1) in the primer paint composition (A). This amount range is desirable to achieve excellent appearance and chemical resistance.

Examples of commercially available products of calcium carbonate include Nano Coat S-25 and MC Coat S-10 (both produced by Maruo Calcium Co., Ltd., trade names); Kasi-gloss (produced by Nichigo-Movinyl Co., Ltd.); Neolight SS and Neolight SA-200 (both produced by Takehara Industries, trade names); and the like. Examples of commercially available products of barium sulfate include barium sulfate 100, baryta BF-1 (both produced by Sakai Chemical Industry Co., Ltd.), and the like.

In order to obtain a coated article having excellent appearance, corrosion resistance, weatherability, and chemical resistance by coating using a wet-on-wet process, the total amount of the oil absorption (*p) of the rust preventive pigment (a2), color pigment (a3), and extender pigment (a4), per 100 g of the total solids content of the epoxy resin (a1) in the primer paint composition (A), is preferably 16 to 50 ml, more preferably 20 to 43 ml, and even more preferably 25 to 40 ml.

(*p) Total amount of oil absorption: The amounts of the pigments X, Y, and Z are 10 g, 20 g, and 30 g, respectively, per 100 g of the total solids of the epoxy resin (a1).

When the oil absorption (*q) of the pigment X is $X_s$ (ml/100 g), the oil absorption of the pigment Y is $Y_s$ (ml/100 g), and the oil absorption of the pigment 2 is $Z_s$ (ml/100 g), the total amount of oil absorption can be obtained by the following formula.

The total amount of oil absorption=$[X_s \times (10/100)] + [Y_s \times (20/100)] + [(Z_s \times (30/100)]$ (*q) Oil absorption: The oil absorption of each pigment is the value of oil absorption (ml/100 g) determined according to a method described in the boiled linseed oil method (JIS K 5101-13-2).

The primer paint composition (A) may include a silane coupling agent (a5), ultraviolet ray absorbent, light stabilizer, rheology control agent, antifoaming agent, pigment dispersant, surface adjusting agent, surfactant, curing agent, curing catalyst, thickener, preservative, antifreezing agent, or the like, as necessary.

Silane Coupling Agent (a5)

The primer paint composition (A) used in the present invention may include a silane coupling agent (as) in order to improve corrosion resistance. Examples of the silane coupling agent (a5) include amino group-containing silane coupling agents, such as γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, γ-ureidopropyltriethoxysilane, N-(β-(N-vinylbenzylaminoethyl)-γ-aminopropyltrimethoxysilane, and γ-anilinopropyltrimethoxysilane; epoxy group-containing silane coupling agents, such as γ-glycidoxypropylmethyldimethoxysilane, γ-glycidoxypropyltriethoxysilane, and β-(3,4-epoxycyclohexyl)ethyltrimethoxysilane; carboxy-containing silane coupling agents, such as β-carboxylethylphenylbis(2-methoxyethoxy) silane, and N-β-(N-carboxymethylaminoethyl)-γ-aminopropyltrimethoxysilane; and the like.

Of these, amino group-containing silane coupling agents and epoxy group-containing silane coupling agents are desirable to improve corrosion resistance. These silane coupling agents may be used singly, or in a combination of two or more.

Examples of commercially available products of the silane coupling agent (a5) include KBM-402, KBM-403, KBM-502, KBM-503, KBM-603, KBE-903, KBE-602, and KBE-603 (all produced by Shin-Etsu Chemical Co., Ltd., trade names).

When the silane coupling agent (a5) is incorporated in the present invention, the amount of the silane coupling agent (a5) is 0.1 to 10 parts by mass, preferably 0.5 to 5 parts by mass, and more preferably 0.8 to 3.5 parts by mass, per 100 parts by mass of the solids content of the epoxy resin (a1). This amount range is desirable to achieve excellent appearance and corrosion resistance.

Top Paint Composition

The top paint composition is a composition containing an acrylic resin (b1) and an active methylene blocked polyisocyanate compound (b2). The paint composition contains the acrylic resin (b1) and the active methylene blocked polyisocyanate compound (b2) in a proportion of 60 to 80 parts by mass:20 to 40 parts by mass, per 100 parts by mass of the total solids content of the acrylic resin (b1) and the active methylene blocked polyisocyanate compound (b2).

Acrylic Resin (b1)

The acrylic resin (b1) is obtained by copolymerizing a mixture comprising a hydroxy group-containing radically polymerizable unsaturated monomer (b11) and another radically polymerizable unsaturated monomer (b12).

Examples of the hydroxy group-containing radically polymerizable unsaturated monomer (b11) include 2-hydroxyethyl (meth)acrylate, 2-hydroxypropyl (meth)acrylate, 3-hydroxypropyl (meth)acrylate, and hydroxybutyl (meth) acrylate, as well as PLACCEL FM1, PLACCEL FM2, PLACCEL FM3, PLACCEL FA1, PLACCEL FA2, and PLACCEL FA3 (all produced by Daicel Corporation, trade names, caprolactone-modified hydroxy(meth)acrylates); and the like.

In the present specification, the term "(meth)acrylate" means acrylate or methacrylate. The term "(meth)acryloyl" means acryloyl or methacryloyl. The term "(meth)acrylamide" means acrylamide or methacrylamide.

Examples of another radically polymerizable unsaturated monomer (b12) include carboxy group-containing radically polymerizable unsaturated monomers, such as acrylic acid, methacrylic acid, crotonic acid, itaconic acid, maleic acid, and fumaric acid; alkoxysilyl group-containing unsaturated monomers, such as γ-(meth)acryloyloxypropyltrimethoxysilane, γ-(meth)acryloyloxypropylmethyldimethoxysilane, γ-(meth)acryloyloxypropyltriethoxysilane, and vinyltrimethoxysilane; $C_{1-18}$ alkyl or cycloalkyl (meth)acrylates, such as methyl (meth)acrylate, ethyl (meth)acrylate, propyl (meth)acrylate, butyl (meth)acrylate, hexyl (meth)acrylate, octyl (meth)acrylate, lauryl (meth)acrylate, 2-ethylhexyl (meth)acrylate, and cyclohexyl (meth)acrylate; aromatic vinyl monomers, such as styrene; and (meth)acrylamide monomers, such as (meth)acrylic acid amide, N,N-dimethylol (meth)acrylamide, N,N-dimethoxymethyl (meth)acrylamide, N,N-di-n-butoxymethyl (meth)acrylamide, N-methoxymethyl-N-methylol (meth)acrylamide, N-methylol (meth)acrylamide, and N-alkoxymethyl(meth)acrylamide group-containing unsaturated monomer represented by formula (1) below:

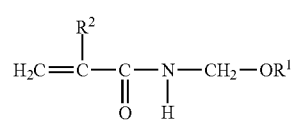

(1)

wherein $R^1$ represents $C_{1-8}$ alkyl, and $R^2$ represents a hydrogen atom or methyl.

Examples of the N-alkoxymethyl(meth)acrylamide group-containing unsaturated monomer represented by formula (1) include N-methoxymethyl (meth)acrylamide, N-ethoxymethyl (meth)acrylamide, N-propoxymethyl (meth)acrylamide, N-isopropoxymethyl (meth)acrylamide, N-butoxymethyl (meth)acrylamide, N-isobutoxymethyl (meth)acrylamide, N-hexoxymethyl (meth)acrylamide, and N-isohexoxymethyl (meth)acrylamide.

The amounts of such radical polymerizable unsaturated monomers are preferably such that the amount of the hydroxy group-containing radical polymerizable unsaturated monomer (b11) is 1 to 40 mass %, preferably 5 to 30 mass %; and the amount of another radical polymerizable unsaturated monomer (b12) is 60 to 99 mass %, and preferably 70 to 95 mass %, based on the total amount of radical polymerizable unsaturated monomers.

The acrylic resin (b1) can be obtained by mixing the hydroxy group-containing radical polymerizable unsaturated monomer (b11) and another radical polymerizable unsaturated monomer (b12) to perform a radical polymerization reaction in an organic solvent that is kept at about 50 to 300° C., preferably 60 to 250° C. in the presence of a polymerization initiator and an inert gas such as nitrogen for about 1 to 24 hours, preferably about 2 to 10 hours.

A polyester resin-modified acrylic resin that is modified with a polyester resin can also be used. The polyester resin-modified acrylic resin can be produced by a conventionally known method. Examples include a method of polymerizing a polyester resin having a polymerizable unsaturated group with an acrylic resin (b1) that is polymerizable therewith. The use of the polyester resin-modified acrylic resin for the top paint composition (B) can improve corrosion resistance.

When a polyester resin-modified acrylic resin is used as part of the acrylic resin (b1), the proportion of the acrylic resin and the polyester-modified acrylic resin is preferably such that acrylic resin:polyester-modified acrylic resin=70 to 100 parts:0 to 30 parts, and particularly preferably acrylic resin:polyester-modified acrylic resin=70 to 80 parts:20 to 30 parts.

Preferable examples of organic solvents used in the radical polymerization reaction include alcohols, such as n-propanol, isopropanol, n-butanol, t-butyl alcohol, and isobutyl alcohol; and ethers, such as ethylene glycol monobutyl ether, methyl carbitol, 2-methoxyethanol, 2-ethoxyethanol, 2-isopropoxyethanol, 2-butoxyethanol, ethylene glycol monomethyl ether, ethylene glycol monoethyl ether, ethylene glycol monobutyl ether, 1-methoxy-2-propanol, 1-ethoxy-2-propanol, and propylene glycol monomethyl ether. In addition to the above, aromatic solvents, such as xylene and toluene; ketones, such as acetone, methylethylketone, 2-pentanone, 2-hexanone, methyl isobutyl ketone, isophorone, and cyclohexanone; and esters, such as methyl acetate, ethyl acetate, pentyl acetate, 3-methoxybutyl acetate, 2-ethylhexyl acetate, benzyl acetate, cyclohexyl acetate, methyl propionate, and ethyl propionate, may be optionally used in combination.

Examples of polymerization initiators used in the radical polymerization reaction include benzoyl peroxide, di-t-butyl hydroperoxide, t-butyl hydroperoxide, cumyl peroxide, cumene hydroperoxide, t-butylperoxy benzoate, lauryl peroxide, acetyl peroxide, azobisisobutyronitrile, and the like.

The obtained acrylic resin (b1) has a weight average molecular weight of 3,000 to 50,000, particularly preferably 4,000 to 15,000, an acid value of 1 to 20 mg KOH/g, and a hydroxyl value of 40 to 200 mg KOH/g.

Active Methylene Blocked Polyisocyanate Compound (b2)

The active methylene blocked polyisocyanate compound (b2) is a blocked polyisocyanate compound obtained by blocking free isocyanate groups of polyisocyanate compounds with an active methylene compound used as a blocking agent.

Of blocked polyisocyanate compounds, the active methylene blocked polyisocyanate compound (b2) is a blocked polyisocyanate compound having excellent reactivity at a relatively low temperature. For example, by heating to 80° C. or more, and preferably 900° C. or more, the active methylene blocked polyisocyanate compound is reacted with a polyol such as an acrylic resin to promote the cross-linkage of the coating film.

Specific examples of the polyisocyanate compound include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatmethyl caproate; and aliphatic triisocyanates, such as lysine ester triisocyanate, 1,4,8-triisocyanateoctane, 1,6,11-triisocyanateundecane, 1,8-diisocyanato-4-isocyanatomethyloctane, 1,3,6-triisocyanatehexane, and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, and norbornane diisocyanate; and alicyclic triisocyanates, such as 1,3,5-triisocyanatecyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1) heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1) heptane.

Examples of aromatic-aliphatic polyisocyanates include aromatic-aliphatic diisocyanates, such as 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; and aromatic-aliphatic triisocyanates, such as 1,3,5-triisocyanatamethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, and 4,4'-diphenylether diisocyanate; aromatic triisocyanates, such as triphenylmethane-4,4',4'-triisocyanate, 1,3,5-triisocyanatobenzene, and 2,4,6-triisocyanatotoluene; and aromatic tetraisocyanates, such as diphenylmethane-2,2',5,5'-tetraisocyanate.

Examples of polyisocyanate derivatives include dimers, trimers, biurets, allophanates, carbodiimides, uretdiones, urethoimines, isocyanurates, oxadiazinetriones, polymethylene polyphenyl polyisocyanates (crude MDI, polymeric MDI), and crude TDI of the polyisocyanate compounds stated above.

From the viewpoint of corrosion resistance and weatherability, preferable examples of the polyisocyanate compound include aliphatic polyisocyanate compounds, alicyclic polyisocyanate compounds, and the derivatives thereof.

The active methylene compound, which is a blocking agent, is a compound containing an active methylene group in a molecule. Specific examples include dimethyl malonate, diethyl malonate, dipropyl malonate, ethyl acetoacetate, methyl acetoacetate, acetylacetone, and the like.

Of the active methylene compounds, which are blocking agents, dipropyl malonate or the like is preferable from the viewpoint of low-temperature curability, storage stability, etc.

The number average molecular weight of the active methylene blocked polyisocyanate compound (b2) is preferably 3,000 or less, and particularly preferably within the range of 100 to 1,500.

In order to improve curability, an organic tin compound or the like can be used as a curing catalyst, if necessary.

The amount of the acrylic resin (b1) is 60 to 80 parts by mass, and preferably 65 to 75 parts by mass; and the amount of the active methylene blocked polyisocyanate compound (b2) is 20 to 40 parts by mass, and preferably 25 to 35 parts by mass on a solids basis, per 100 parts by mass of the total solids content of the acrylic resin (b1) and the active methylene blocked polyisocyanate compound (b2). This amount range is desirable to attain excellent paint stability and coating film curability.

The top paint composition used in the present invention may contain barium sulfate (b3) in order to improve appearance and weatherability. The average particle size of barium sulfate (b3) is preferably within the range of 0.01 to 5 μm, and particularly preferably 0.05 to 1 μm.

Examples of commercially available products of barium sulfate (b3) include Barifine BF-20 (produced by Sakai Chemical Industry Co., Ltd., trade name, average particle size of 0.03 μm), Bariace B-30 (produced by Sakai Chemical Industry Co., Ltd., trade name, average particle size of 0.3 μm), and Sparwite W-5HB (produced by Sino-Can, trade name, barium-sulfate powder, an average particle size of 1.6 μm). In this specification, the average particle size is measured by using a UPA-EX250 (trade name, produced by Nikkiso Co., Ltd., a size distribution measuring device according to a dynamic light scattering method).

The amount of barium sulfate (b3) in the top paint composition (B) is preferably 1 to 50 parts by mass, more preferably 5 to 45 parts by mass, and even more preferably 10 to 40 parts by mass, per 100 parts by mass of the total solids content of the acrylic resin (b1) and the active methylene blocked polyisocyanate compound (b2).

Polyether Polyol

The top paint composition used in the present invention can use polyether polyol as necessary to further improve appearance etc.

Examples of polyether polyol include compounds obtained by adding an alkylene oxide to an active hydrogen-containing compound, such as polyhydric alcohol, polyhydric phenol, or polycarboxylic acid.

Examples of active hydrogen-containing compounds include water, polyhydric alcohols (ethylene glycol, diethylene glycol, trimethylene glycol, propylene glycol, 1,4-butanediol, 1,6-hexanediol, neopentyl glycol, 1,4-dihydroxymethylcyclohexane, cyclohexylene glycol, and like dihydric alcohols; glycerin, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol, trimethylolethane, trimethylolpropane, and like trihydric alcohols; pentaerythritol, 1,2,3,4-pentanetetrol, 2,3,4,5-hexanetetrol, 1,2,4,5-pentanetetrol, 1,3,4,5-hexanetetrol, diglycerin, sorbitan, and like tetrahydric alcohols; adonitol, arabitol, xylitol, triglycerin, and like pentahydric alcohols; dipentaerythritol, sorbitol, mannitol, iditol, inositol, dulcitol, talose, allose, and like hexahydric alcohols; sucrose and like octahydric alcohols; polyglycerin, and the like); polyhydric phenols (polyhydric phenols (e.g., pyrogallol, hydroquinone, and phloroglucin), bisphenols (e.g., bisphenol A and bisphenol sulfone)); polycarboxylic acids (aliphatic polycarboxylic acids (e.g., succinic acid and adipic acid), aromatic polycarboxylic acids (e.g., phthalic acid, terephthalic acid, and trimellitic acid)); and mixtures of two or more of these.

Preferable examples of trivalent or higher-valent alcohol for forming polyetherpolyol having at least three hydroxy groups per molecule include glycerin, trimethylolethane, trimethylolpropane, pentaerythritol, sorbitan, sorbitol, and the like.

The polyether polyol can usually be obtained by performing an addition reaction of an alkylene oxide to the active hydrogen-containing compound in the presence of an alkali catalyst at a temperature of 60 to 160° C. under ordinary pressure or increased pressure by a usual method. Examples of alkylene oxides include ethylene oxide, propylene oxide, butylene oxide, and the like.

Of polyether polyols, a particularly preferable example is a compound represented by formula (2) below,

(wherein l, m, and n are each independently an integer of 1 or more, and l+m+n=3 to 15; and each A in $(AO)_l$, $(AO)_m$, and $(AO)_n$ may be identical or different, and represents ethylene and/or propylene).

Examples of commercially available products of polyether polyol include Sannix GP-600, Sannix GP-1000, Excenol 430, Excenol 385SO, Excenol 450ED, Excenol 500ED, Excenol 750ED (all produced by Asahi Glass Co., Ltd., trade names), Adeka polyether (Adeka Corporation, trade name), Actcol T-1000 (Mitsui Chemicals, Inc., trade name), and the like. Such polyether polyol has a number average molecular weight of less than 3,000, preferably 90 to 2,000, and more preferably 500 to 1,500.

When polyether polyol is incorporated in the top paint composition (B), the amount of the polyether polyol is 0.1 to 30 parts by mass, preferably 1 to 20 parts by mass, and more preferably 3 to 15 parts by mass, per 100 parts by mass of the total solids content of the acrylic resin (b1) and the active methylene blocked polyisocyanate compound (b2). This amount range is desirable to obtain a coating film with excellent appearance.

The top paint composition (B) may also include, as necessary, a color pigment, extender pigment, rust preventive pigment, rheology control agent, ultraviolet absorber, light stabilizer, antifoaming agent, pigment dispersant, surface adjusting agent, surfactant, curing catalyst, thickener, preservative, antifreezing agent, and the like.

As the rust preventive pigment, pigments listed in the rust preventive pigment (a2) section can be used. Examples include zinc oxide, phosphite compounds, phosphate compounds, and the like. As the color pigment, pigments listed in the color pigment (a3) section can be used. Examples include titanium dioxide, benz imidazolone yellow, iron oxide red, and the like. As the extender pigment, those listed in the extender pigment (a4) section can be used. Examples include talc, barium sulfate, calcium carbonate, clay, and the like.

The rheology control agent is used for improving appearance by controlling the fluidity of a paint. Examples of rheology control agents include clay minerals (e.g., metal silicate, montmorillonite), acryls (e.g., those containing in a molecule a structure of polymer or oligomer of acrylic acid ester or methacrylic acid ester), polyolefins (e.g., polyethylene, polypropylene), amides (higher-fatty-acid amide, polyamide, oligomer, etc.), polycarboxylic acids (including derivatives containing in a molecule at least two carboxyl groups), cellulose (including various derivatives, such as cellulose nitrate, acetyl cellulose, and cellulose ether), urethane (polymer or oligomer having an urethane structure in a molecule), urea (polymer or oligomer having a urea structure in a molecule), urethane urea (polymer or oligomer having a urethane structure and urea structure in a molecule), and the like.

Examples of commercially available products of rheology control agents include amide waxes, such as Disparlon 6900 (produced by Kusumoto Chemicals, Ltd.) and Thixol W-300 (Kyoeisha Chemical Co., Ltd.); polyethylene waxes, such as Disparlon 4200 (produced by Kusumoto Chemicals, Ltd.); cellulose-based rheology control agents, such as CAB (cellulose acetate butyrate, produced by Eastman Chemical Products, Inc.), HEC (hydroxyethyl cellulose), hydrophobized HEC, and CMC (carboxy methylcellulose); urethane urea-based rheology control agents, such as BYK-410, BYK-411, BYK-420, and BYK-425 (all produced by BYK-Chemie); sulfuric acid ester-based anionic rheology control agents, such as Flownon SDR-80 (Kyoeisha Chemical Co., Ltd.); polyolefin-based rheology control agents, such as Flownon SA-345HF (Kyoeisha Chemical Co., Ltd.); and higher fatty acid amide rheology control agents, such as Flownon HR-4AF (Kyoeisha Chemical Co., Ltd.).

The amount of the rheology control agent when incorporated is 0.1 to 20 parts by mass, preferably 0.5 to 15 parts by mass, and more preferably 0.9 to 5 parts by mass, per 100 parts by mass of the total solids content of the acrylic resin (b1) and the active methylene blocked polyisocyanate compound (b2).

Method for Forming a Multilayer Coating Film

The method for forming a multilayer coating film of the present invention is a method comprising forming the uncured coating film of the primer paint composition (A) on a substrate, forming the top coating film of the top paint composition (B) on the uncured coating film, and simultaneously drying the films.

Examples of the substrate include cold-rolled steel sheets, black steel sheets, zinc-alloy-plated steel sheets, electrogalvanized steel sheets, and the like. These substrates may be subjected to shot-blasting, surface adjustment, surface treatment, or the like.

The primer paint composition (A) can be applied by a method such as immersion coating, brush coating, roll brush coating, spray coating, roll coating, spin coating, dip coating, bar coating, flow coating, electrostatic coating, airless coating, electrodeposition coating, and dye coating. The film thickness (when dried) is usually 10 to 150 μm, and preferably 30 to 80 μm.

After the formation of the coating film of the primer paint composition (A), setting at room temperature or preheating may be performed as necessary.

The top paint composition (B) can be applied to the uncured coating film of the primer paint composition (A) by a method such as immersion coating, brush coating, roll brush coating, spray coating, roll coating, spin coating, dip coating, bar coating, flow coating, electrostatic coating, airless coating, electrodeposition coating, and dye coating. The film thickness (when dried) is usually 10 to 150 μm, and preferably 30 to 80 μm. Subsequently, drying is performed at ordinary temperature to 160° C. for 10 to 120 minutes, and preferably at 60 to 120° C. for 20 to 90 minutes, thus obtaining a multilayer coating film.

EXAMPLES

The present invention is described below in more detail with reference to Production Examples, Examples, and Comparative Examples. However, the present invention is not limited to these. In the examples, "parts" and "%" are expressed on a mass basis.

Production of Primer Paint Composition

Production Example 1

Production Example of Primer Paint Composition No. 1

Primer paint composition No. 1 was obtained by steps 1 and 2 shown below.

Step 1:

Swasol 1000 (produced by Cosmo Oil Co., Ltd., aromatic hydrocarbon-based solvent) was added in an appropriate amount to 50 parts of Arakyd 9205 (*1), 20 parts of EXPERT NP1000 (*4), 70 parts of Ti-Pure R-902 (*6), 40 parts of LAKABAR SF (*8), and 70 parts of Neolight SA-200 (*10). The mixture was dispersed in a sand mill, thus obtaining a pigment dispersion paste.

Step 2:

50 parts (solids content) of Arakyd 9205 (*1) and 1 part of Disparlon A 603-20X (*13) were added to the pigment dispersion paste obtained above, and Swasol 1000 (produced by Cosmo Oil Co., Ltd., aromatic hydrocarbon-based solvent) was added thereto. The mixture was stirred, and the solids content was adjusted, thereby obtaining primer paint composition No. 1 having a solids content of 70%.

Production Examples 2 to 10

Production Examples of Primer Paint Compositions Nos. 2 to 10

Primer paint compositions Nos. 2 to 10 were obtained as in Production Example 1, except that the component ratios shown in Table 1 were used.

TABLE 1

| | | | | Production Example No. | | | | | | | | | |
|---|---|---|---|---|---|---|---|---|---|---|---|---|---|
| | | | | 1 | 2 | 3 | 4 | 5 | 6 | 7 | 8 | 9 | 10 |
| | | | | Primer paint composition No. | | | | | | | | | |
| | | | | 1 | 2 | 3 | 4 | 5 | 6 | 7 | 8 | 9 | 10 |
| Primer paint composition Component ratio | Step 1 Pigment dispersion paste | (a1) | Arakyd 9205 (weight average molecular weight: 30,000) (*1) | 50 | | | 50 | | 50 | 50 | 50 | 50 | 50 |
| | | | Arakyd 9201N (weight average molecular weight: 50,000) (*2) | | 50 | | | 50 | | | | | |
| | | | Arakyd 9203N (weight | | | 50 | | | | | | | |

TABLE 1-continued

| | | | | | Production Example No. | | | | | | | | | |
|---|---|---|---|---|---|---|---|---|---|---|---|---|---|---|
| | | | | 1 | 2 | 3 | 4 | 5 | 6 | 7 | 8 | 9 | 10 | |
| | | | | | | | | Primer paint composition No. | | | | | | |
| | | | | 1 | 2 | 3 | 4 | 5 | 6 | 7 | 8 | 9 | 10 | |
| | | | average molecular weight: 30,000) (*3) | | | | | | | | | | | |
| | | (a2) | EXPERT NP1000 (*4) | 20 | 20 | 20 | 20 | | 20 | 40 | 20 | 20 | 20 | |
| | | | K-WHITE 140 (*5) | | | | | 20 | | | | | | |
| | | (a3) | Ti-Pure R-902 (*6) | 70 | 70 | 70 | | 45 | 50 | 50 | 50 | 50 | 50 | |
| | | | Tipaque CR-93 (*7) | | | | 70 | | | | | | | |
| | | (a4) | LAKABAR SF (*8) | 40 | 40 | 40 | | 30 | 30 | 30 | 30 | 30 | 30 | |
| | | | Barifine BF-20 (*9) | | | | 40 | 30 | 30 | 30 | 30 | 30 | 30 | |
| | | | Neolight SA-200 (*10) | 70 | 70 | 70 | 40 | 30 | 30 | 30 | 30 | 30 | 30 | |
| | | | T Talc (*11) | | | | | | | | 5 | 25 | 10 | |
| Step 2 Paint | | (a1) | Arakyd 9205 (*1) | 50 | | | 50 | | 50 | | 50 | 50 | 50 | |
| | | | Arakyd 9201N (weight average molecular weight: 50,000) (*2) | | 50 | | | 50 | | | | | | |
| | | | Arakyd 9203N (weight average molecular weight: 30,000) (*3) | | | 50 | | | | | | | | |
| | | Others | KBM-403 (*12) | | | | | | 0.5 | 7 | | | 5 | |
| | | | Disparlon A603-20X (*13) | 1 | 1 | 1 | 1 | 1 | 1 | 1 | 1 | 1 | 1 | |

Numerals in the table represent the mass solids content.

Comparative Production Examples 1 to 4

Production Examples of Primer Paint Compositions Nos. 11 to 14

Primer paint compositions Nos. 11 to 14 were obtained as in Production Example 1, except that the component ratios shown in Table 2 were used.

TABLE 2

| | | | | Comparative Production Example No. | | | |
|---|---|---|---|---|---|---|---|
| | | | | 1 | 2 | 3 | 4 |
| | | | | Primer paint composition No. | | | |
| | | | | 11 | 12 | 13 | 14 |
| Primer paint composition Component ratio | Step 1 Pigment Dispersion paste | (a1) | Arakyd 9205 (weight average molecular weight: 30,000) (*1) | 50 | | 50 | 50 |
| | | | Arakyd 9201N (weight average molecular weight: 50,000) (*2) | | 50 | | |
| | | (a2) | EXPERT NP1000 (*4) | 20 | 20 | 50 | 20 |
| | | | K-WHITE 140 (*5) | | | | |
| | | (a3) | Ti-Pure R-902 (*6) | 100 | 100 | | 100 |
| | | | Tipaque CR-93 (*7) | | | 50 | |
| | | (a4) | LAKABAR SF (*8) | 80 | 80 | | 55 |
| | | | Barifine BF-20 (*9) | | | 10 | |
| | | | Neolight SA-200 (*10) | 80 | 80 | 10 | 55 |
| | | | T TALC (*11) | | | | 50 |
| | Step 2 Paint | (a1) | Arakyd 9205 (weight average molecular weight: 30,000) (*1) | 50 | | 50 | 50 |
| | | | Arakyd 9201N (weight average molecular weight: 50,000) (*2) | | 50 | | |
| | | Others | KBM-403 (*12) | | | | |
| | | | Disparlon A603-20X (*13) | 1 | 1 | 1 | 1 |

Numerals in the table represent the mass solids content.

(*1) Arakyd 9205: Arakawa Chemical Industries, Ltd., trade name, modified bisphenol A type epoxy resin, weight average molecular weight of 30,000, glass transition temperature of 84° C.

(*2) Arakyd 9201N: Arakawa Chemical Industries, Ltd., trade name, modified bisphenol A type epoxy resin, weight average molecular weight of 50,000, glass transition temperature of 94° C.

(*3) Arakyd 9203N: Arakawa Chemical Industries, Ltd., trade name, modified bisphenol A type epoxy resin, weight average molecular weight of 30,000, glass transition temperature of 84° C.

(*4) EXPERT NP1000: Toho Ganryo Kogyo Co., Ltd., trade name, basic phosphorous acid calcium, oil absorption of 40 ml/100 g (*5) K-WHITE 140: Kikuchi Color Co., Ltd., trade name, aluminum dihydrogen triphosphate, oil absorption of 32 ml/100 g (*6) Ti-Pure R-902: Du Pont Co., Ltd., trade name, titanium white, oil absorption of 16 ml/100 g
(*7) Tipaque CR-93: Ishihara Sangyo Kaisha, Ltd., trade name, titanium white, oil absorption of 20 ml/100 g
(*8) LAKABAR SF: produced by LAKAVISUTH, trade name, barium sulfate powder, average particle size of 10.4 μm, oil absorption of 10 ml/10 g
(*9) Barifine BF-20: produced by Sakai Chemical Industry Co., Ltd., trade name, barium sulfate having an average particle size of 0.03 μm, oil absorption of 24 ml/100 g
(*10) Neolight SA-200, Takehara Kagaku Kogyo Co., Ltd., trade name, calcium carbonate, oil absorption of 32 ml/100 g
(*11) T talc: produced by Takehara Kagaku Kogyo Co., Ltd., trade name, talc, average particle size of 9.0 μm, oil absorption of 27 ml/100 g
(*12) KBM-403: Shin-Etsu Chemical Co., Ltd., trade name, epoxy group-containing silane coupling agent
(*13) Disparlon A603-20X: Kusumoto Chemicals, Ltd., tradename, thickener Production of Top Paint Composition Production Example 17

Production of Acrylic Resin Solution 28 parts of Swasol 1000 (Cosmo Oil Co., Ltd., aromatic hydrocarbon-based solvent), 85 parts of toluene, 41.6 parts of styrene, 6.9 parts of n-butyl acrylate, 19 parts of isobutyl methacrylate, 15 parts of PLACCEL PM-3 (*14), 17 parts of 2-hydroxyethyl methacrylate, 0.5 parts of acrylic acid, and 8 parts of di-tert-butyl hydroperoxide were reacted under nitrogen gas at 110° C., thus obtaining an acrylic resin solution having a solids mass content of 45%. The obtained acrylic resin has an acid value of 3.9 mg KOH/g, hydroxy value of 94.9 mg KOH/g, and weight average molecular weight of 11,000.
(*14) PLACCEL FM-3: Daicel Chemical Industries, Ltd., trade name, ε-caprolactone modified vinyl monomer of 2-hydroxyethyl acrylate Production Example 18

Production of Polyester Modified Acrylic Resin Solution (According to JP1996-302204A)

143 parts of Beckosol P470-70 (produced by DIC Corporation, trade name, soybean oil-based long-oil alkyd resin) and 457 parts of mineral spirit were added to a four-necked flask equipped with a stirrer, a thermometer, a condenser tube, and a nitrogen gas inlet; and heated to 100° C.

Subsequently, a mixture containing 200 parts of styrene, 489 parts of isobutyl methacrylate, 106 parts of 2-ethylhexyl acrylate, 100 parts of 2-hydroxyethyl methacrylate, 5 parts of methacrylic acid, 200 parts of mineral spirit, 300 parts of "Solvesso 100," and 10 parts of benzoyl peroxide was added dropwise thereto over 4 hours.

After the completion of the dropwise addition, reaction was performed for 8 hours at the same temperature, thereby obtaining a polyester modified acrylic resin solution having a solids mass content of 50%. The obtained polyester modified acrylic resin has an acid value of 2.5 mg KOH/g and a weight average molecular weight of 9,000.

Production Example 11

Production Example of Top Paint Composition No. 1

75 parts (solids content) of the acrylic resin solution obtained in Production Example 17, 12 parts of Tipaque CR-93 (*7), 12 parts of Hostaperm Yellow H-3G (*15), 12 parts of Bayferrox 4905 (*16), 1 part of TINUVIN 292 (*17), and 25 parts of Duranate MF-K60X (*18) were mixed, and the solids content of the mixture was adjusted by Swasol 1000 (produced by Cosmo Oil Co., Ltd., aromatic hydrocarbon-based solvent). The mixture was placed in a ball mill and dispersed under stirring for 6 hours to thereby obtain top paint composition No. 1 having a solids content of 60%.

Production Examples 12 to 16

Production Examples of Top Paint Compositions Nos. 2 to 6

Top paint compositions Nos. 2 to 6 were obtained as in Production Example 11, except that the component ratios shown in Table 3 were used.

TABLE 3

| | | Production Example No. | | | | | |
|---|---|---|---|---|---|---|---|
| | | 11 | 12 | 13 | 14 | 15 | 16 |
| | | Top paint composition No. | | | | | |
| | | 1 | 2 | 3 | 4 | 5 | 6 |
| Component ratio | Acrylic resin obtained by Production Example 17 | 75 | 65 | 75 | 75 | 55 | 70 |
| | Polyester-modified acrylic resin obtained by Production Example 18 | | | | | 20 | |
| | Tipaque CR-93 (*7) | 12 | 12 | 12 | 12 | 12 | 12 |
| | Hostaperm Yellow H-3G (*15) | 12 | 12 | 12 | 12 | 12 | 12 |
| | Bayferrox 4905 (*16) | 12 | 12 | 12 | 12 | 12 | 12 |
| | TINUVIN 292 (*17) | 1 | 1 | 1 | 1 | 1 | 1 |
| | Duranate MFK-60X (*18) | 25 | 35 | 25 | 25 | 25 | |
| | Blocked polyisocyanate compound (BN-1) (*19) | | | | | | 30 |
| | Super Beckamine L 166 (*20) | | | 5 | 5 | | |
| | Actcol T-1000 (*21) | | | | 10 | | |

Numerals in the table represent the mass solids content.

Comparative Production Examples 5 to 9

Production Examples of Top Paint Compositions Nos. 7 to 11

Top paint compositions Nos. 7 to 11 were obtained as in Production Example 11, except that the component ratios shown in Table 4 were used.

TABLE 4

| | | Comparative Production Example No. | | | | |
|---|---|---|---|---|---|---|
| | | 5 | 6 | 7 | 8 | 9 |
| | | Top paint composition No. | | | | |
| | | 7 | 8 | 9 | 10 | 11 |
| Component ratio | Acrylic resin obtained by Production Example 17 | 85 | 75 | 75 | 75 | 50 |
| | Tipaque CR-93 (*7) | 12 | 12 | 12 | 12 | 12 |
| | Hostaperm Yellow H-3G (*15) | 12 | 12 | 12 | 12 | 12 |
| | Bayferrox 4905 (*16) | 12 | 12 | 12 | 12 | 12 |
| | TINUVIN 292 (*17) | 1 | 1 | 1 | 1 | 1 |
| | Duranate MFK-60X (*18) | 15 | | | | 50 |
| | Duranate TPA-B80 (*22) | | 25 | | | |

TABLE 4-continued

| | Comparative Production Example No. | | | | |
|---|---|---|---|---|---|
| | 5 | 6 | 7 | 8 | 9 |
| | Top paint composition No. | | | | |
| | 7 | 8 | 9 | 10 | 11 |
| Sumidur BL3175 (*23) | | | | 25 | |
| Sumidur BL3575 (*24) | | | | | 25 |

Numerals in the table represent the mass solids content.
(*15) Hostaperm Yellow H-3G: produced by Clariant, trade name, Hansa yellow-based yellow pigment
(*16) Bayferrox 4905: Lanxess, Inc., trade name, red pigment
(*17) TINUVIN 292: BASF A.G., trade name, light stabilizer
(*18) Duranate MFK-60X: produced by Asahi Kasei Chemicals Corporation, trade name, active methylene blocked polyisocyanate)
(*19) Blocked polyisocyanate compound (BN-1):
Blocked Polyisocyanate Compound Synthesized as Follows:

1610 parts of "Sumidur N-3300" (trade name, produced by Sumika Bayer Urethane Co., Ltd., polyisocyanate having a hexamethylene diisocyanate-derived isocyanurate structure, solids content: about 100%, isocyanate group-containing rate: 21.8%), 275 parts of "Uniox M-550" (produced by NOF Corporation, polyethylene-glycol monomethyl ether, average molecular weight of about 550), and 0.9 parts of 2,6-di-tert-butyl-4-methyl phenol were placed in a reaction vessel equipped with a thermometer, a thermostat, a stirrer, a reflux condenser, a nitrogen inlet tube, a dropping funnel, and a simplified trap for the removed solvent. The components were fully mixed, and heated at 130° C. for 3 hours in a nitrogen stream.

Subsequently, 550 parts of ethyl acetate and 1150 parts of diisopropyl malonate were placed in the reaction vessel. While the mixture was stirred in a nitrogen stream, 14 parts of a 28% methanol solution of sodium methoxide was added to the reaction vessel, and the resulting mixture was stirred at 65° C. for 8 hours. The amount of isocyanate in the resulting resin solution was about 0.1 mol/kg. 3110 parts of 4-methyl-2-pentanol was added to the reaction vessel. While the temperature of the reaction system was maintained at 90 to 95° C., the solvent was distilled off under reduced pressure over 3 hours, thus obtaining 4920 parts of a blocked polyisocyanate compound (BN-1) solution. 585 parts of isopropanol was contained in the simplified trap. The blocked polyisocyanate compound (BN-1) solution had a solids content of about 60%.
(*20) Super Beckamine L 166: produced by DIC Corporation, trade name, alkylated melamine resin, weight average molecular weight:
(*21) Actcol T-1000: produced by Mitsui Chemicals, Inc., trade name, polyether polyol, number average molecular weight of 1,000
(*22) Duranate TPA-B80: produced by Asahi Kasei Chemicals Corporation, trade name, MEK oxime blocked polyisocyanate
(*23) Sumidur BL3175: Sumika Bayer Urethane Co., Ltd., trade name, MEK oxime blocked polyisocyanate
(*24) Sumidur BL3575: Sumika Bayer Urethane Co., Ltd., trade name, pyrazole blocked polyisocyanate.

Production of Multilayer-Coating-Film-Containing Coating Sheet

Example 1

Production of Multilayer-Coating-Film-Containing Coating Sheet No. 1

Multilayer-coating-film-containing coating sheet No. 1 was obtained by steps 1 to 3 shown below.

Step 1:

Primer paint composition No. 1 obtained in Production Example 1 was vertically applied by spraying to a cold-rolled steel sheet (size: 0.8×70×150 mm, Palbond #3020) to a film thickness of 45 μm (when dried). Setting was then performed at 25° C. for 3 minutes.

Step 2:

Subsequently, top paint composition No. 1 obtained in Production Example 11 was vertically applied by spraying through a wet-on-wet process to the primer coating film to a film thickness of 40 μm (when dried), thus forming a top coating film.

Step 3:

The coating films obtained by steps 1 and 2 were subjected to setting at 25° C. for 10 minutes, then heated and dried at 120° C. for 20 minutes, thus obtaining multilayer-coating-film-containing coating sheet No. 1.

Examples 2 to 15

Production of Multilayer-Coating-Film-Containing Coating Sheets Nos. 2 to 15

Multilayer-coating-film-containing coating sheets Nos. 2 to 15 were obtained as in Example 1, except that the paints shown in Table 5 were used as the primer paint composition of step 1 and the top paint composition of step 2.

Comparative Examples 1 to 9

Production of Multilayer-Coating-Film-Containing Coating Sheets Nos. 16 to 24

Multilayer-coating-film-containing coating sheets Nos. 16 to 24 were obtained as in Example 1, except that the paints shown in Table 6 were used as the primer paint composition of step 1 and the top paint composition of step 2.

Coating Film Performance Test

Each multilayer-coating-film-containing coating sheet was subjected to a coating film performance test according to the following test conditions. The results are shown in Tables 5 and 6.

TABLE 5

| | | Example No. | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | | Multilayer-coating-film-containing coating sheet No. | | | | | | | | | | | | | | |
| | | 1 | 2 | 3 | 4 | 5 | 6 | 7 | 8 | 9 | 10 | 11 | 12 | 13 | 14 | 15 |
| Multilayer coating film | Primer paint composition No. | 1 | 1 | 1 | 1 | 1 | 1 | 2 | 3 | 4 | 5 | 6 | 7 | 8 | 9 | 10 |
| | Top paint composition No. | 1 | 2 | 3 | 4 | 5 | 6 | 1 | 1 | 1 | 1 | 1 | 1 | 1 | 1 | 1 |
| Coating film performance | Appearance (*25) | A | A | A | A | A | A | A | A | A | A | A | A | A | A | A |
| | Pencil hardness (*26) | H | 2H | 2H | H | F | H | H | H | H | H | H | H | H | H | H |
| | Corrosion resistance (*27) | A | A | A | A | S | A | S | A | A | S | A | S | A | A | S |
| | Weatherability (*28) | S | S | S | S | S | S | S | S | S | S | S | S | S | S | S |
| | Chemical resistance (*29) | A | A | A | A | A | A | A | A | A | A | A | A | A | A | A |

TABLE 6

| | | Comparative Example No. | | | | | | | | |
|---|---|---|---|---|---|---|---|---|---|---|
| | | 1 | 2 | 3 | 4 | 5 | 7 | 7 | 8 | 9 |
| | | Multilayer-coating-film-containing coating sheet No. | | | | | | | | |
| | | 16 | 17 | 18 | 19 | 20 | 21 | 22 | 23 | 24 |
| Multilayer coating film | Primer paint composition No. | 1 | 1 | 1 | 1 | 1 | 11 | 12 | 13 | 14 |
| | Top paint composition No. | 7 | 8 | 9 | 10 | 11 | 1 | 1 | 1 | 1 |
| Coating film performance | Appearance (*25) | B | C | C | B | C | B | B | B | C |
| | Pencil hardness (*26) | F | B | 2B | B | B | H | 2H | HB | F |
| | Corrosion resistance (*27) | A | B | B | A | B | A | A | C | A |
| | Weatherability (*28) | B | C | C | B | B | S | S | A | A |
| | Chemical resistance (*29) | B | C | C | B | B | A | A | A | A |

Performance Evaluation
(*25) Appearance:

The appearance of the coating surface of each multilayer-coating-film-containing coating sheet obtained in the Examples and Comparative Examples was visually observed.

A: Excellent smoothness was obtained without the formation of the mixed layer of the top coating film and the primer coating film, posing no problems.

B: The layers of the top coating film and the primer coating film were mixed, and at least one slight reduction in appearance selected from the group consisting of swelling, dulling, and flaking was observed.

C: The layers of the top coating film and the primer coating film were significantly mixed, and at least one significant reduction in appearance selected from the group consisting of swelling, dulling, and flaking was observed.

(*26) Pencil Hardness:

Following the procedure specified by JIS K5600-5-4, the lead of a pencil was placed against the surface of each multilayer-coating-film-containing coating sheet (test coating sheet) obtained in the Examples and Comparative Examples at an angle of about 45°, and moved forward about 10 mm at a constant speed while firmly pressing it against the surface of the test coating sheet, without breaking the lead. The hardness number of the pencil with the greatest hardness that did not tear the coating film was recorded as the pencil hardness (In the tables, 2H, H, F, HB, B, 2B, in order of hardness).

(*27) Corrosion Resistance:

Cross-cuts were made with a knife on each multilayer-coating-film-containing coating sheet obtained in the Examples and Comparative Examples. The coating sheet was subjected to a salt-spray resistance test for 120 hours in accordance with JIS Z-2371. Corrosion resistance was evaluated according to the following criteria, based on the width of rusting and blistering from the knife cut.

S: The maximum width of rusting and blistering from the cut was less than 2 mm (single side)

A: The maximum width of rusting and blistering from the cut was not less than 2 mm and less than 3 mm (single side).

B: The maximum width of rusting and blistering from the cut was not less than 3 mm and less than 4 mm (single side).

C: The maximum width of rusting and blistering from the cut was not less than 4 mm (single side).

(*28) Weatherability:

Each multilayer-coating-film-containing coating sheet obtained in the Examples and Comparative Examples was subjected to the sunshine carbon arc lamp type weathering test according to JIS B-7533. The test was conducted until the irradiation time became 1200 hours at maximum. The irradiation time when the coating film of the test sheet has a gloss retention rate of 80% relative to the gloss value before the test was measured.

S: The gloss retention rate was 80% or more even when the irradiation time was 1200 hours.

A: The irradiation time in which the gloss retention rate was exactly 80% was 1000 hours or more and less than 1200 hours.

B: The irradiation time in which the gloss retention rate was less than 80% was 800 hours or more and less than 1000 hours.

C: The irradiation time in which the gloss retention rate was less than 80% was less than 800 hours.

(*29) Chemical Resistance:

The rear faces and end faces of the multilayer-coating-film-containing coating sheets obtained in the Examples and Comparative Examples were sealed, and the sheets were immersed in a 5% sodium hydroxide aqueous solution for 24 hours (23° C.). The appearance of each coating film was evaluated.

A: Not discolored or blistered.
B: Discolored or blistered.
C: Remarkably discolored or remarkably blistered.

INDUSTRIAL APPLICABILITY

A coated article having excellent appearance, corrosion resistance, weatherability, and chemical resistance can be obtained by coating using a wet-on-wet process.

The invention claimed is:

1. A method for forming a multilayer coating film comprising;
   forming an uncured coating film of a primer paint composition (A) on a substrate,
   forming a top coating film of a top paint composition (B) on the uncured coating film, and
   simultaneously drying the films;
   wherein the primer paint composition (A) is a paint composition comprising an epoxy resin (a1), a rust preventive pigment (a2), a color pigment (a3), and an extender pigment (a4),
   wherein the primer paint composition (A) contains the rust preventive pigment (a2) in an amount of 20 to 40 parts by mass, the color pigment (a3) in an amount of 40 to 150 parts by mass, and the extender pigment (a4) in an amount of 80 to 115 parts by mass, per 100 parts by mass of the total solids content of the epoxy resin (a1); and
   wherein the top paint composition (B) is a paint composition comprising an acrylic resin (b1) and an active methylene blocked polyisocyanate compound (b2),
   wherein the top paint composition (B) contains the acrylic resin (b1) and the active methylene blocked polyisocyanate compound (b2) in a proportion of 60 to 80 parts by mass to 20 to 40 parts by mass, per 100 parts by mass of the total solids content of the acrylic resin (b1) and the active methylene blocked polyisocyanate compound (b2).

2. The method according to claim 1, wherein the primer paint composition (A) further comprises a silane coupling agent (a5) in an amount of 0.1 to 10 parts by mass, per 100 parts by mass of the total solids content of the epoxy resin (a1).

3. The method according to claim 1, wherein the primer paint composition (A) comprises talc as at least part of the extender pigment (a4) in an amount of 0.1 to 30 parts by mass, per 100 parts by mass of the total solids content of the epoxy resin (a1).

4. The method according to claim 1, wherein the top paint composition (B) comprises a melamine resin (b3) in an amount of 1 to 15 parts by mass, per 100 parts by mass of the total solids content of the acrylic resin (b1) and the active methylene blocked polyisocyanate compound (b2).

5. The method according to claim 1, wherein the top paint composition (B) further comprises polyether polyol in an amount of 0.1 to 30 parts by mass, per 100 parts by mass of the total solids content of the acrylic resin (b1) and the active methylene blocked polyisocyanate compound (b2).

6. Construction machinery or industrial machinery coated by using the method according to claim 1.

* * * * *